(12) United States Patent
Ho

(10) Patent No.: US 7,611,599 B2
(45) Date of Patent: Nov. 3, 2009

(54) METHOD FOR PRODUCTION OF DECORATIVE ARTICLE AND DECORATIVE ARTICLE PRODUCED THEREFROM

(75) Inventor: Kwok Hung Aeneas Ho, Central (HK)

(73) Assignee: Duty Free Group (China) Limited, Central (HK)

( * ) Notice: Subject to any disclaimer, the term of this patent is extended or adjusted under 35 U.S.C. 154(b) by 0 days.

(21) Appl. No.: 12/040,090

(22) Filed: Feb. 29, 2008

(65) Prior Publication Data

US 2008/0251961 A1  Oct. 16, 2008

(30) Foreign Application Priority Data

Apr. 10, 2007  (HK)  .................................. 07103692

(51) Int. Cl.
*B29C 47/00* (2006.01)
*H05K 3/46* (2006.01)
*A44C 13/00* (2006.01)
*A44C 25/00* (2006.01)
*A61M 25/00* (2006.01)
*A47G 35/00* (2006.01)

(52) U.S. Cl. ........................ 156/245; 156/150; 63/1.16; 63/34; 264/264; 428/542.2

(58) Field of Classification Search .................. 63/1.11, 63/1.16, 26, 33, 34; 156/63, 89.11, 89.24, 156/91, 150, 151, 242, 245, 278, 280; 264/132, 264/241, 248, 249, 250, 259, 265, 267, 268, 264/260, 264, 511, 522, 544, 255; 65/36, 65/45, 47, 48, 49, 59.1, 59.2, 59.24, 59.3, 65/59.34, 59.4, 156; 425/127, 128; 249/83, 249/91, 93, 94, 95, 96, 97; 428/28, 67, 542.2
See application file for complete search history.

(56) References Cited

U.S. PATENT DOCUMENTS

| 909,487 | A | * | 1/1909 | Wallace | ........................ 249/91 |
| 2,105,227 | A | * | 1/1938 | Richter | .......................... 63/15 |
| 2,263,340 | A | * | 11/1941 | Kraemer | ........................ 59/80 |

(Continued)

FOREIGN PATENT DOCUMENTS

CN  1583422 A  2/2005

(Continued)

*Primary Examiner*—Jeff H Aftergut
*Assistant Examiner*—Brian R Slawski
(74) *Attorney, Agent, or Firm*—Rabin & Berdo, P.C.

(57) ABSTRACT

The invention provides a method for production of a decorative article comprising a body having at least one engagement stage, and a decorative member made of a decoration material capable of being thermally softened and having at least one surface which is engageable with the engagement stage of the body. The said method comprises the steps by placing softened decoration material into a mold shaped and sized to correspond to the decorative member to be produced and having at least one surface that is brought into surface-contact with the engagement stage of the body and then press-molding; taking the semi-finished decorative member out of the mold to cool down slowly to room temperature; and placing the surface of the cooled semi-finished decorative member over the engagement stage of the body and splicing them together. By using the method of the present invention, a decorative article can be produced.

19 Claims, 1 Drawing Sheet

U.S. PATENT DOCUMENTS

| | | | | |
|---|---|---|---|---|
| 3,014,298 | A | * 12/1961 | Kirshner | 428/28 |
| 3,039,280 | A | * 6/1962 | Flad et al. | 63/32 |
| 3,342,817 | A | * 9/1967 | Young | 264/248 |
| 3,591,393 | A | * 7/1971 | Rankine | 501/83 |
| 3,802,945 | A | * 4/1974 | James | 428/1.5 |
| 4,030,317 | A | * 6/1977 | Rogell | 63/32 |
| 4,318,996 | A | * 3/1982 | Magder | 501/84 |
| 4,610,899 | A | 9/1986 | Miller | |
| 4,809,416 | A | * 3/1989 | Poltash | 29/896.41 |
| 5,328,775 | A | 7/1994 | Hoshino et al. | |
| 6,003,228 | A | * 12/1999 | Riggio | 29/896.41 |
| 2005/0274445 | A1 | * 12/2005 | Chang | 156/63 |
| 2006/0144091 | A1 | * 7/2006 | Kato et al. | 65/135.6 |

FOREIGN PATENT DOCUMENTS

| | | | |
|---|---|---|---|
| CN | 2853459 | Y | 1/2007 |
| FR | 2164547 | A | 8/1973 |
| JP | 63260832 | A * | 10/1988 |
| JP | 6-253914 | | 9/1994 |

\* cited by examiner

METHOD FOR PRODUCTION OF DECORATIVE ARTICLE AND DECORATIVE ARTICLE PRODUCED THEREFROM

FIELD OF THE INVENTION

The present invention relates to a processing technology for a decorative article, more particularly, to a method for production of a decorative article and a decorative article produced therefrom.

BACKGROUND OF THE INVENTION

A wide variety of decorative articles have been produced in the market to meet various needs and demands. Among them, jewelry items, such as earrings, necklaces, bracelets, finger rings and the like, are common ornaments people like to wear.

Most of currently available jewelry items include generally two parts: a decorative member for decorative purpose and a supportive member for supporting or running through the decorative member. It is known in the art that many materials may be used to produce the decorative member. Examples of such materials are precious metal, diamond, glass, clay, polyresin and cubic zirconia, among which, glass is endued with unique colors and artistic or aesthetic feelings, subject to a processing procedure. Consequently, glass jewelry items are becoming more and more popular.

Jewelry items in existence are generally constructed by two modes. The first mode is to string one or more decorative members to fabricate a jewelry item which always displays a dull style and has poor diverse features. The second mode is to simply mount a decorative member onto a supportive member to fabricate a jewelry item which might lack delicate and fine details, in addition to weak engagement between the decorative member and the supportive member.

Accordingly, there is a need for a processing technology which enables fabrication of a variety of delicate and well-patterned decorative articles with their decorative members firmly engaged with their supportive member. There is also a need for decorative articles with high durability and various designs.

SUMMARY OF THE INVENTION

It is an object of the present invention to provide a method for production of decorative articles with various appearances, designs and high durability.

Another object of the present invention is to provide a wide variety of decorative articles with fantastic decorative effects.

To attain the aforesaid objects, the invention provides a method for production of a decorative article, said decorative article comprising a body having at least one engagement stage, and a decorative member made of a decoration material capable of being thermally softened and having at least one surface which is engageable with the engagement stage of the body, said method comprising the steps of:
(i) placing softened decoration material into a mold and then press-molding, said mold being shaped and sized to correspond to the decorative member to be produced and having at least one surface that is brought into surface-contact with the engagement stage of the body;
(ii) taking the semi-finished decorative member out of the mold to allow it to cool down slowly to room temperature; and
(iii) placing the surface of the cooled semi-finished decorative member over the engagement stage of the body and splicing them together.

The term "spliced or splicing" used herein refers to attachment of a surface of the decorative member to an engagement stage of the body, for example, in an adhesive or mounting manner.

Preferably, the decorative article is a jewelry item.

In one preferred embodiment of the invention, the engagement stage of the body is a platform and the surface of the decorative member is planar, so that they are in planar surface contact.

According to the invention, the decoration material is selected from the group consisting of glass, metal, polyresin and Fimo clay.

In one specific embodiment of the invention, the mold is made of steel and accurately reproduced in accordance with the decorative member; the mold undergoes the press-molding followed by heating treatment until it is softened so that burrs formed during the press-molding are cut and trimmed off. The press-molding may be carried out by use of a press machine.

In order to produce decorative effect, the step i) is preceded by a step of forming characters, patterns or graphical designs on the softened decoration material. In one preferred embodiment, said step comprises the following steps of:
a) flattening the softened decoration material to an extent before it is placed into the mold;
b) applying one or more layers of metallic foils, for example silver foil or gold foil, onto the flattened decoration material;
c) forming desirable characters, patterns or graphical designs on the metallic foils using a molten color glass stick; and
d) coating a layer of transparent glass after the step c).

In the step ii), the semi-finished decorative member may be submerged into insulation powder such as gypsum powder or put on an insulation plate such as gypsum plate to allow it to cool down slowly to room temperature.

The step iii) is preferably preceded by a step of subjecting the engagement stage of the body to a film coating treatment such as an electroplating treatment. In order to secure the film firmly to the engagement stage, a surface-smoothing treatment such as polishing treatment is generally required prior to the film coating treatment of the engagement stage.

In the step iii), the surface of the semi-finished decorative member and the engagement stage of the body may be spliced together by use of an adhesive or gripping claws.

The step iii) further comprises a step of providing one or more layers of paddings between the surface of the semi-finished decorative member and the engagement stage of the body, so as to exhibit variation in configuration and/or appearance or to provide additional functions.

The present invention also relates to a decorative article produced by the method of the invention.

According to the method of the invention, the surface-contact between the decorative member and the body allows them to be spliced in a stable and firm manner. The decorative articles produced by the method of the invention can display distinctive and colorful patterns and characters. In the present invention, a mold and a press machine are used as new techniques for the first time in production process of decorative articles.

To have a better understanding of the invention reference is made to the following detailed description of the invention and an embodiment thereof in conjunction with the accompanying drawings.

DETAILED DESCRIPTION OF THE INVENTION

Figure 1:
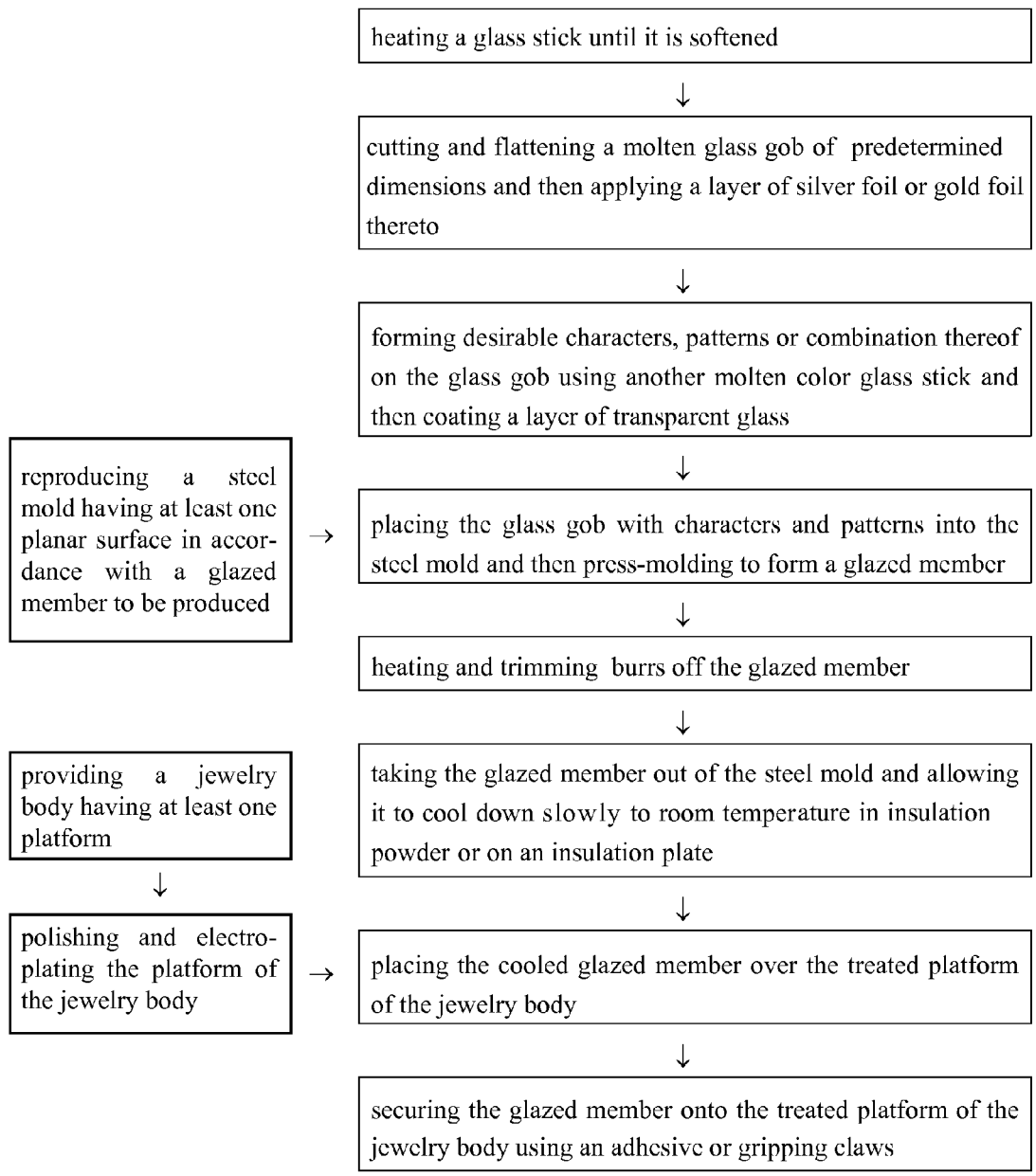
FIG. 1 is a flow diagram of a method for production of a glazed jewelry item according to the invention.

Referring now to FIG. 1, a method for production of a glazed jewelry item using glass as a starting material is shown. The glazed jewelry item comprises a glazed member and a jewelry body having a platform. A finger ring, earring, necklace pendant, bracelet or the like may be used as the jewelry body. Any suitable materials is possible to fabricate the jewelry body, an example of such material is metal. The jewelry body other than its platform may be produced in many different configurations, forms and materials. The technological process of the embodiment will be described in details as follows.

First of all, a desirable design drawing for the glazed member to be produced is made for matching with the platform of the jewelry body, followed by preparation of a steel mold which has at least one planar surface engageable with the platform. Particularly, semi-precious stones such as black agate are cut and trimmed on the platform to make an initial mold which is then used to prepare the steel mold. In this embodiment, the steel mold consists of a lower section configured to reproduce the glazed member and an upper section which is a planar surface engageable with the platform and the lower section.

The mold is made of steel in light of its high resistance to compression applied by a press machine when molding the glazed member. Replacement of steel 1 by other materials having sufficient hardness for use in preparation of the mold is possible. Also, replacement of the semi-precious stones by other suitable materials for use in making the initial mold is possible. This is obvious to a person with ordinary skills in the art.

After making of the steel mold, the glazed member is produced, for example, by using the following procedure. A glass stick is heated to until it is softened so that a molten glass gob can be cut into predetermined dimensions with reference to the platform of the jewelry body. Subsequently, the glass gob is gripped and flattened slightly for example by using a gripper. Then, a layer of silver foil or gold foil is applied evenly onto the flattened glass gob. Another molten color thin glass stick is then used to draw appealing characters, patterns or combination thereof on the silver foil or the gold foil. In this step, a variety of characters, patterns or graphical designs can be added to the glass gob so that the obtainable glazed member can exhibit esthetical appearance. According to the terminology as described by the industry, the glass which has been formed with characters, patterns or graphical designs is also called as "coloured glaze or glaze". The glass gob is then coated with a layer of transparent glass for the purpose of providing protection for characters, patterns or graphical designs on the glass gob and enhancing clarity and visibility.

The softened glass gob with the characters, patterns or graphical designs is then placed into the lower section of the steel mold which is then moved to the press machine. The upper section of the steel mold is placed over the lower section. The glass gob is molded by operating the press machine to press the upper section against the lower section.

As the upper section fits with the lower section, excessive amount of softened glass is extruded to the outside of the steel mold during the press-molding process. A semi-finished glazed member is formed. This semi-finished glazed member is of shape and size substantially identical to the predetermined design drawing, with a smooth planar surface which corresponds to the upper section of the steel mold and is to be spliced to the platform of the jewelry body.

The glazed member usually has burrs at its perimeter after completion of the press-molding process. It is preferable to heat this glazed member again until it is softened for facilitating trimming of the burrs.

Then, the glazed member is taken out of the steel mold and submerged into insulation powder or put on an insulation plate to allow it to cool down slowly to room temperature. If the glazed member in its entirety comes into direct contact with the air, fracture or cracking of the glazed member may take place since the cooling-down is too rapid. Gypsum powder or a gypsum plate may be used for the cooling down. As a usual practice, a glazed member with an opening or openings formed thereon is submerged completely in the gypsum powder in order to avoid direct contact of the opening with the air. A glazed member without any opening or recess may be simply put on the gypsum plate to cool down. It takes from dozens of minutes to a few hours for the glazed member to cool down to room temperature slowly, depending on the insulation material to be used and the dimension of the glazed member. Obviously, any method of cooling-down is possible, provided that the cooling rate is not too rapid to ensure that there is no fracture or cracking of the glazed member.

Now the glazed member is ready for splicing to the platform of the jewelry body. Pretreatment of the platform of the jewelry body is necessary before performing this splicing operation. The pretreatment usually includes the steps of subjecting the platform of the jewelry body to a surface-smoothing treatment such as polishing and a film coating treatment such as electroplating, so that the platform is hardened and will not be deformed easily. Also, the pretreatment can turn the rough surface of the platform of the jewelry body into a smooth and level surface. It also renders the glazed jewelry item more delicate.

The pretreated platform is spliced to the glazed member to fabricate the glazed jewelry item. Particularly, the planar surface of the cooled glazed member is placed over the pretreated platform and then they are secured to each other by use of, for example, an adhesive or gripping claws. It is obvious that any type of securing means known in the art is possible.

The glazed jewelry items produced by the method of the invention exhibit various pattern designs and are reliable and safe to wear by the user. It is known that currently available glazed jewelry items are produced in the form of pendants or string ornaments with their glazed members entirely exposed and therefore vulnerable to breakage. While the glazed jewelry item according to the invention, with its glazed member and platform of jewelry body firmly spliced together in surface-contact manner, has greatly increased its resistance to breakage.

It is within the ability of a person with ordinary skills in the art to change planar surface contact between the glazed member and the platform of the jewelry body into curved surface contact.

As a variant, one or more layers of paddings may be arranged between the glazed member and the platform of the jewelry body to form a sandwich structure, whereby exhibiting variation in configuration and/or appearance or providing additional functions. For example, an elastic layer can be added between the glazed member and the platform of the jewelry body to kindle the glazed member with elastic characteristic and consequently enhance the play value of the glazed jewelry items. In this case, they are in surface contact with one another, which is obvious to a person with ordinary skills in the art.

In the embodiment as described above, glass is used as a starting material to produce a glazed jewelry item. It is obvious that a wide range of materials are possible for use in making the decorative member which is spliced to the jewelry body. For example, metal, polyresin and Fimo clay are preferred choices depending on customers' preferences or needs for decorative design. Such materials have a common characteristic of being capable of thermally softened, molded and cured. As a result, the method of the invention is applicable to any kind of materials having said characteristic.

The invention thus provides a method for producing a decorative article with its decorative member and body brought into good surface-contact. This method allows for formation of distinctive and colorful patterns, characters or graphical designs on the decorative article and opens indefinite possibilities for creative and esthetical pursues. The invention also adopts a mold and a press machine in production process of the decorative article, whereby improving the productivity.

While the embodiment described herein is intended as an exemplary decorative article, it will be appreciated by those skilled in the art that the present invention is not limited to the embodiment illustrated. Numerous variations and modifications are easily obtainable by means of the skilled person's common knowledge without departing from the scope of the invention, however, such variations and modifications should fall into the scope of this invention.

What is claimed is:

1. A method for production of a decorative article,
said decorative article comprising
a body having at least one engagement stage, and
a decorative member made of a decoration material capable of being thermally softened and having at least one surface which is engageable with the engagement stage of the body, said method comprising the steps of:
   i) placing softened decoration material into a mold and then press-molding, said mold being shaped and sized to correspond to the decorative member to be produced and having at least one surface that is brought into surface-contact with the engagement stage of the body;
   ii) taking the semi-finished decorative member out of the mold to allow it to cool down slowly to room temperature; and
   iii) placing the surface of the cooled semi-finished decorative member over the engagement stage of the body and splicing them together.

2. The method as claimed in claim 1, wherein the decorative article is a jewelry item.

3. The method as claimed in claim 1, wherein the engagement stage of the decorative body is a platform and the surface of the decorative member is planar, so that they are in planar surface contact.

4. The method as claimed in claim 1, wherein the decoration material is selected from the group consisting of glass, metal, polyresin and Fimo clay.

5. The method as claimed in claim 1, wherein in the step i), the mold is made of steel and accurately reproduced in accordance with the decorative member; the mold undergoes the press-molding followed by heating treatment until it is softened so that burrs formed during the press-molding are trimmed off.

6. The method as claimed in claim 1, wherein in the step i), the press-molding is carried out by use of a press machine.

7. The method as claimed in claim 1, wherein the step i) is preceded by a step of forming characters, patterns or graphical designs on the softened decoration material.

8. The method as claimed in claim 7, wherein the step of forming characters, patterns or graphical designs on the softened decoration material comprises the steps of:
   a) flattening the softened decoration material before it is placed into the mold;
   b) applying one or more layers of metallic foils onto the flattened decoration material;
   c) forming desirable characters, patterns or graphical designs on the metallic foils using a molten color glass stick; and
   d) coating a layer of transparent glass after the step c).

9. The method as claimed in claim 8, wherein the metallic foil applied in the step b) is a silver foil or gold foil.

10. The method as claimed in claim 1, wherein in the step ii), the semi-finished decorative member is submerged into insulation powder or put on an insulation plate to cool down slowly to room temperature.

11. The method as claimed in claim 10, wherein the insulation powder is gypsum powder, the insulation plate is a gypsum plate.

12. The method as claimed in claim 1, wherein the step iii) is preceded by a step of subjecting the engagement stage of the body to a film coating treatment.

13. The method as claimed in claim 12, wherein the film coating treatment is an electroplating treatment.

14. The method as claimed in claim 12, wherein a surface-smoothing treatment is carried out prior to the film coating treatment of the engagement stage of the body.

15. The method as claimed in claim 14, wherein the surface-smoothing treatment is a polishing treatment.

16. The method as claimed in claim 1, wherein in the step iii), the surface of the semi-finished decorative member and the engagement stage of the body are spliced together by use of an adhesive.

17. The method as claimed in claim 1, wherein in the step iii), the surface of the semi-finished decorative member and the engagement stage of the body are spliced together by use of gripping claws.

18. The method as claimed in claim 1, wherein the step iii) further comprises a step of providing one or more layers of paddings between the surface of the semi-finished decorative member and the engagement stage of the body.

19. A decorative article produced by the method as claimed in claim 1.

* * * * *